United States Patent [19]

Sibley et al.

[11] Patent Number: 4,609,386
[45] Date of Patent: Sep. 2, 1986

[54] PULSATING FLOW SCRUBBER ATTACHMENT

[76] Inventors: John R. Sibley, P.O. Drawer 2048; James R. Masters, Rte. 1, Box 16-D; Oliver C. Squires, 3310 Old Cavern Hwy., all of Carlsbad, N. Mex. 88220

[21] Appl. No.: 769,753

[22] Filed: Aug. 26, 1985

Related U.S. Application Data

[63] Continuation of Ser. No. 574,623, Jan. 27, 1984, abandoned.

[51] Int. Cl.$^4$ .............................................. B01D 47/12
[52] U.S. Cl. ..................................... 55/223; 55/227; 55/228; 55/229; 261/30
[58] Field of Search ............. 55/89, 94, 223, 224, 55/227, 228, 277, 15, 229; 261/30, 125, DIG. 48

[56] References Cited

U.S. PATENT DOCUMENTS

| | | | |
|---|---|---|---|
| 3,406,498 | 10/1968 | Wisting | 261/30 |
| 3,478,496 | 11/1969 | Keough | 261/30 |
| 3,494,099 | 2/1970 | Eng et al. | 55/223 X |
| 3,616,597 | 11/1971 | Stewart | 55/94 |
| 3,763,634 | 10/1973 | Alliger | 55/223 |
| 3,903,212 | 9/1975 | Lefevre | 261/30 |

*Primary Examiner*—Charles Hart
*Attorney, Agent, or Firm*—Harvey B. Jacobson

[57] ABSTRACT

The efficiency of a spray-type scrubber in removing pollutants from gas flowing through the scrubber is improved by applying high frequency pulsations to the gas flow. The pulsations may be applied by a bladed rotor, the blades of which cut across the gas stream in a gas supply duct leading to the scrubber inlet, the rotor being harmonically tuned with a fan which draws the gas through the scrubber.

9 Claims, 6 Drawing Figures

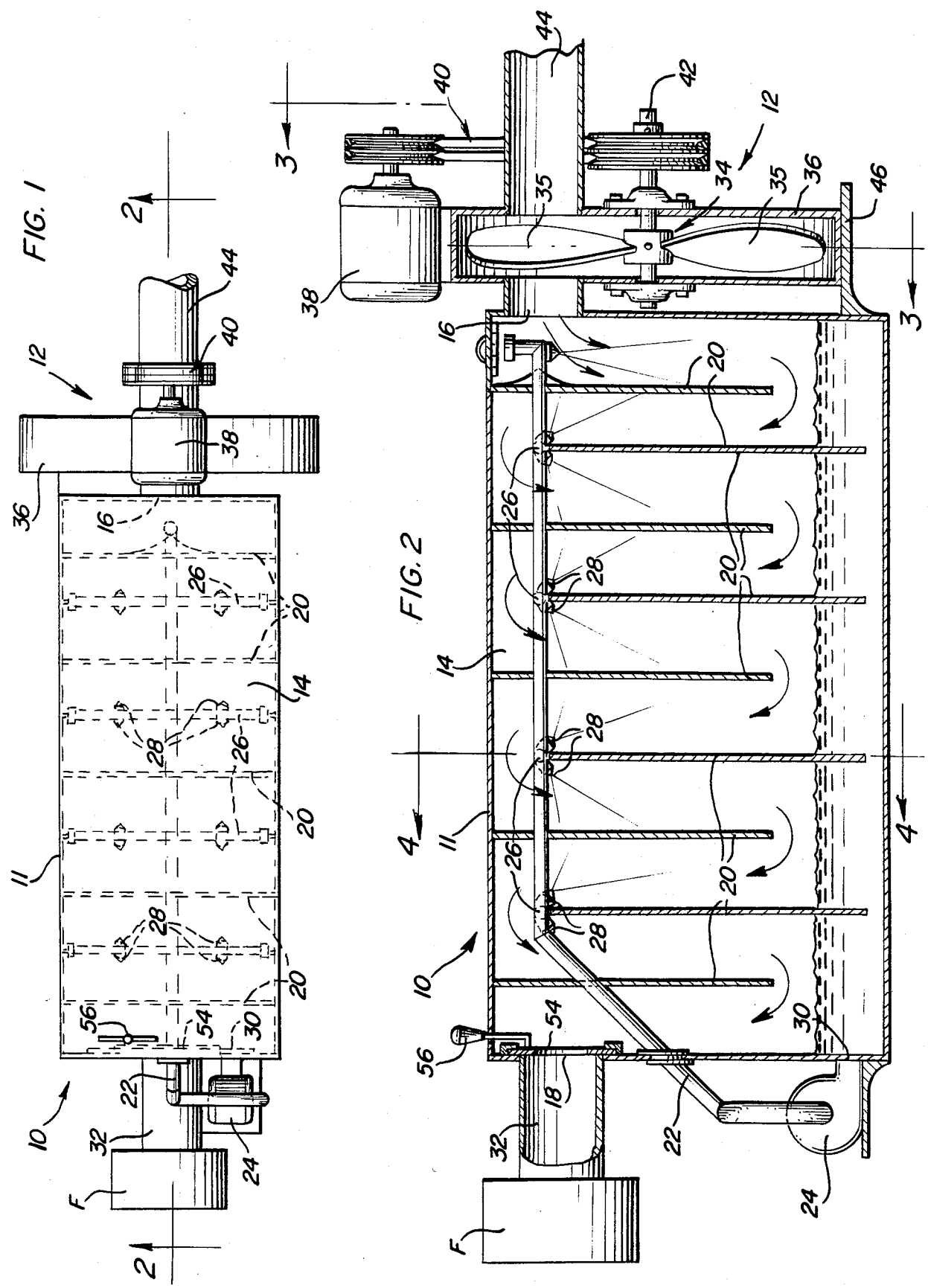

PULSATING FLOW SCRUBBER ATTACHMENT

This application is a continuation of application Ser. No. 574,623 filed Jan. 27, 1984.

BACKGROUND OF THE INVENTION

This invention relates to apparatus, referred to in the art as scrubbers, for removing pollutants from air (or other gas) by passing the air through a scrubber chamber in which the air is contacted by a liquid in order to transfer pollutants from the air to the liquid, thereby cleaning the air.

In one form of scrubber apparatus, for example, air is drawn by a fan through a scrubber chamber provided with internal liquid sprays so that as the air traverses the chamber, pollutants in the air are transferred to the sprayed liquid. The liquid may be collected in a sump or the like at the bottom of the chamber and, after suitable filtration, recycled to the sprays. The chamber may include baffles causing the air to traverse a tortuous path between the chamber inlet and the chamber outlet.

An object of the present invention is to provide a method and apparatus for increasing the efficiency of pollutant transfer from gas to liquid in a spray-type scrubber.

STATEMENT OF PRIOR ART

The following U.S. patents relating to gas treatment apparatus and the like are known to the applicants. However, none of these patents is believed to disclose the features of the present invention.

U.S. Pat. No. 1,770,613
U.S. Pat. No. 2,217,130
U.S. Pat. No. 2,457,292
U.S. Pat. No. 3,406,498
U.S. Pat. No. 4,148,620

SUMMARY OF THE INVENTION

Applicants have found, in accordance with the present invention, that the efficiency of pollutant transfer from gas to liquid in a spray-type scrubber can be improved if pulsations are applied to the gas flow traversing the scrubber chamber.

Thus, in accordance with the invention, means is provided for applying high frequency pulsations to a flow of air or other gas traversing the pollutant transfer chamber of a spray-type scrubber. In a preferred form of the invention, for example, a scrubber may be provided on the air outlet side with a rotary fan for drawing air through the scrubber chamber in conventional manner, and on the inlet side with a pulse generator for applying pulsations to the air flow, and which may be harmonically tuned to the speed of the fan. The pulse generator may, for example, comprise a rotor having blades adapted to cut across an inlet duct delivering air to the scrubber chamber.

Dependent on the frequency of pulsation and the type of pollutants in the air, it has been found that utilization of the invention may double or even triple the efficiency of pollutant removal from gases compared with conventional scrubbers.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 1 is a plan view, partly in section, of a spray-type scrubber with a pulsating flow attachment in accordance with the invention.

FIG. 2 is a sectional view, on an enlarged scale, on line 2—2 of FIG. 1.

DESCRIPTION OF PREFERRED EMBODIMENTS

Figure 3:
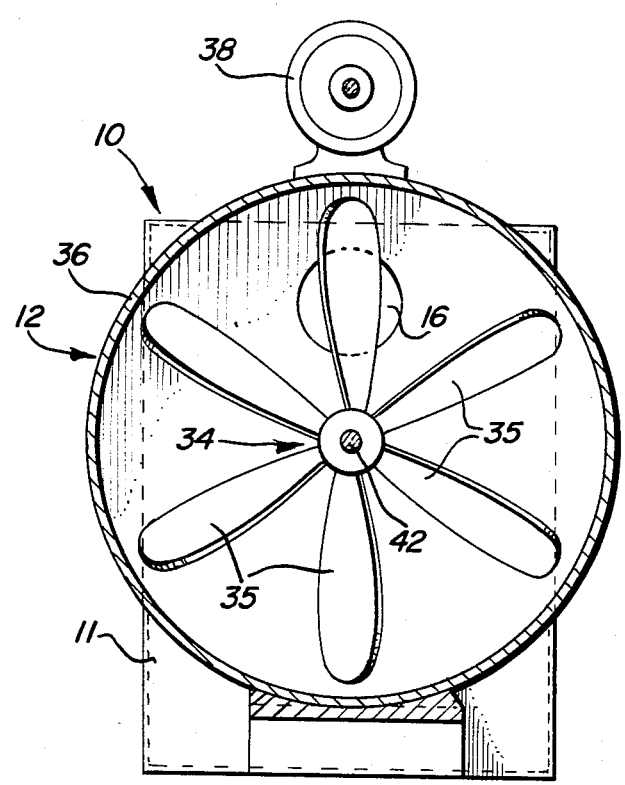
FIG. 3 is a sectional view on line 3—3 of FIG. 2.

In FIGS. 1 to 4 of the drawings, there is shown a conventional spray-type scrubber 10 for removing pollutants from air or other gas, the scrubber being modified by the addition of a flow pulsation attachment 12 in accordance with the invention.

The scrubber 10 may comprise a housing 11 defining a scrubber chamber 14 having an air inlet 16 at one end, and an air outlet 18 at the other end (see FIG. 2). Internally, the chamber may be provided with a series of transverse baffles 20 alternately staggered in the vertical sense so that gas passing through the chamber from the inlet to the outlet traverses a tortuous path as indicated by the arrows in FIG. 2. The chamber may also include a liquid spray system comprising a supply pipe 22 leading from the outlet of a pump 24 external to the chamber, and transverse pipes 26 with spray nozzles 28 in the top of the chamber. Liquid from the sprays collects at the base of the chamber 14, having collected pollutants from gas flowing through the chamber, and is recycled to the sprays by pump 24 after being suitably filtered by means not shown. The pump has an inlet 30 communicating with the base of the chamber. Gas to be scrubbed is drawn through the chamber by a fan (diagrammatically indicated at F) associated with a discharge duct 32 leading from outlet 18.

As previously noted, the scrubber may be of conventional design, and the structure described above is only given by way of example of a suitable scrubber to which the invention may be applied.

Pulsation attachment 12 comprises a rotary pulse generator in the form of a large-diameter bladed rotor 34 in a housing 36, with a variable speed drive motor 38 and a pulley-and-belt drive 40 between the motor and a drive shaft 42 of rotor 34, the blades 35 of rotor 34 being adapted to cut across the stream of gas flowing to inlet 16 of the scrubber through an inlet duct 44, thereby creating pulsations in the gas flow through the scrubber at a frequency dependent on the number of blades on rotor 34 and the speed of rotation thereof, the pulsation frequency preferably being tuned with the speed of rotation of fan F to produce high frequency harmonic gas flow through the scrubber chamber. The pulsation attachment may be supported on a pedestal 46 attached to the scrubber housing.

Figure 5:
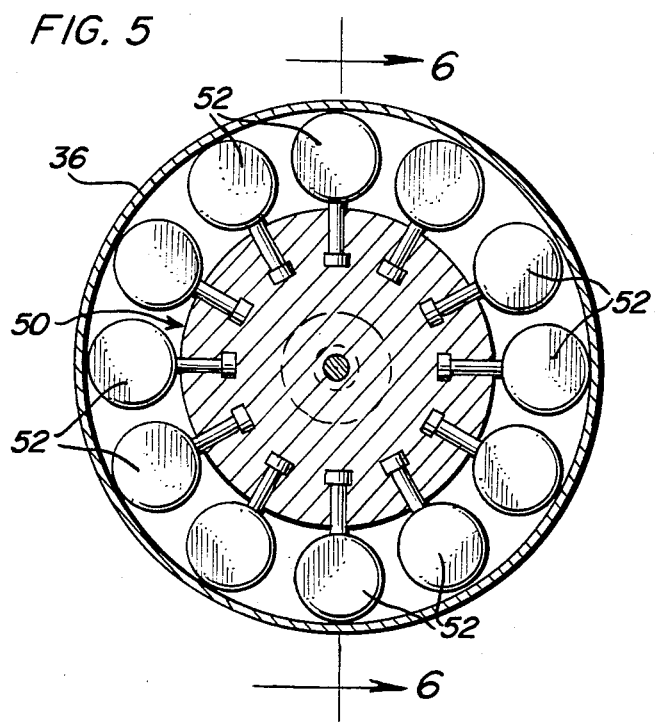
FIG. 5 is a view similar to FIG. 3 showing an alternative form of pulse generator.
Figure 6:
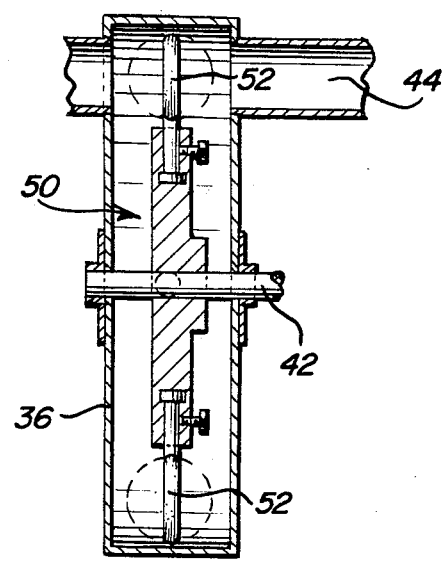
FIG. 6 is a sectional view on line 6—6 of FIG. 5.

Rotor 34 shown in FIGS. 2 and 3 has fixed-pitch fan-type blades 35, and this form of rotor may be replaced by a modified rotor 50 shown in FIGS. 5 and 6 and having variable pitch blades 52 for volume control. The number of rotor blades may, in either case, be varied dependent on the pulsation frequency required in the scrubber chamber.

Figure 4:
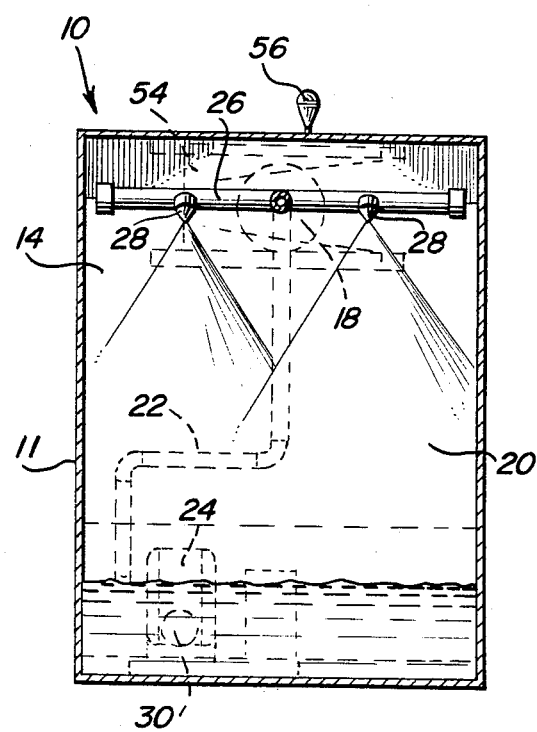
FIG. 4 is a sectional view on line 4—4 of FIG. 1.

Also, as shown in FIGS. 1, 2 and 4, the scrubber chamber may include an adjustable, flow-control gate 54 associated with outlet 18, the gate being manually operable by means of a handle 56 to adjust the flow area of the outlet, thereby varying the back pressure in the scrubber chamber.

It is found that with suitable adjustment in the relative speeds of the scrubber fan F and the pulse generator, high frequency harmonic pulsations can be achieved in the gas flow through the scrubber chamber greatly enhancing the efficiency of pollutant transfer as between the gas and liquid. The particular speed of the pulse generator to achieve optimum results in a high frequency pulsating gas flow may be established experimentally for different size scrubbers. With properly adjusted fans producing high frequency harmonic vibrations in the gas flow, it has been found that even pollutants in the sub-micron range may be successfully removed from gas passing through the scrubber.

As an example of the efficiency increase achieved by the present invention, applicants have successfully removed 85% of pollutants from air containing rubber smoke (obtained by burning automobile tires). This compares with an equivalent figure of 20% of pollutant removal utilizing the same scrubber but without a pulsating flow attachment in accordance with the invention. In such tests, a 6-bladed rotor of the type shown in FIGS. 1 through 4 was used, the rotor being driven at a speed of 3600 rpm. It is contemplated that use of a 10-bladed fan may further increase the efficiency of pollutant removal.

An integral part of the invention is the flow control gate associated with the outlet of the scrubber chamber for creating back pressure within the scrubber chamber. Different scrubbers have different volumes and different elasticities, with different cushioning effects, and the flow control allows for fine tuning of the pulse generators.

Testing of the invention indicates that with rubber smoke air pollutants, higher frequencies of pulsation tend to increase efficiency at a constant flow rate of gas through the scrubber. With salt and potash pollutants however increased frequency of pulsation may also allow higher gas throughputs. It is believed generally that efficiency increases with pulsation frequency provided the gas flow rate remains constant.

It will be appreciated from the foregoing, that the invention is highly beneficial in increasing the efficiency of conventional spray-type scrubbers. Further, numerous modifications are possible within the scope of the invention. As previously indicated, the scrubber structure to which the invention is applicable can be varied from that described and illustrated above, and also other forms of pulse generators may be used to provide high frequency pulsation in place of the rotary type pulse generators described and illustrated.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a spray-type scrubber for removing pollutants from a gas, the scrubber comprising a scrubber chamber having a gas inlet and a gas outlet, liquid spray means within the chamber, and means for providing a flow of gas to be scrubbed through the chamber from the inlet to the outlet in a manner providing contact of the gas with sprayed liqud in the scrubber chamber so as to effect transfer of pollutants from the gas to the liquid, the improvement comprising means for applying pulsations to the gas flowing through the scrubber chamber, wherein the means for applying pulsations to the gas comprises a pulse generator associated with an inlet gas duct leading to the gas inlet of the scrubber chamber, wherein the inlet gas duct is of reduced cross-section relative to the cross-section of the scrubber chamber, and the pulse generator comprises a rotor having an axis externally of the duct spaced from the axis of the duct, and blades of larger diameter than the diameter of the duct adapted to cut across the flow of gas in the inlet duct to provide the pulsations therein.

2. The invention of claim 1 wherein the rotor blades are variablepitch blades.

3. The invention of claim 1 wherein the means for providing flow of gas through the scrubber chamber comprises a fan associated with a gas discharge duct leading from the gas outlet, at least one of said fan and rotor having a variable speed motor for driving same whereby the frequency of pulsations applied to the air flow can be tuned to the speed of rotation of the fan.

4. The invention of claim 1 wherein the scrubber chamber includes a series of internal baffles for causing the gas to traverse a tortuous path between the inlet and the outlet while being subject to the liquid spray means.

5. The invention of claim 1 including means for providing a variable back pressure in the scrubber chamber.

6. The invention of claim 5 wherein the means for providing a variable gas pressure comprises a gate movable across the gas outlet to vary the area thereof.

7. An attachment for use with a spray-type scrubber, the scrubber comprising a scrubber chamber having a gas inlet, a gas outlet, liquid spray means in the chamber, and means for providing a flow of gas to be scrubbed through the chamber from the inlet to the outlet so as to contact the gas with sprayed liquid in the chamber, the attachment comprising means for applying pulsations to the gas flow through the chamber, wherein the attachment includes a fitting for the gas inlet of the scrubber chamber having an inlet duct and a bladed pulse generator means mounted externally of the gas inlet for applying pulsations to gas flowing through the gas inlet by means of pulse generator blades adapted to cut across gas flowing through the duct, wherein the pulse generator comprises a rotor with blades of larger diameter than the diameter of the duct adapted to cut across gas flowing in the duct to provide said pulsations, wherein the rotor is mounted in a rotor housing and the duct opens into the housing at a radial location between the axis of the rotor and the tips of the blades.

8. The invention of claim 7 including a variable speed motor for operating the rotor.

9. The invention of claim 7 wherein the blades are variable pitch blades.

* * * * *